United States Patent [19]
Bhattacharyya et al.

[11] Patent Number: 5,986,160
[45] Date of Patent: Nov. 16, 1999

[54] METHOD OF DESTROYING HAZARDOUS ORGANIC COMPOUNDS

[75] Inventors: Dibakar Bhattacharyya, Lexington, Ky.; Susan Mawhinney, Charleston, W. Va.

[73] Assignee: University of Kentucky Research Foundation, Lexington, Ky.

[21] Appl. No.: 09/036,285

[22] Filed: Mar. 6, 1998

[51] Int. Cl.$^6$ .............................. A62D 3/00; B01D 11/00
[52] U.S. Cl. ........................... 588/205; 588/252; 210/634
[58] Field of Search .................................. 588/205, 252; 210/634; 252/625

[56] References Cited

U.S. PATENT DOCUMENTS

| | | |
|---|---|---|
| 4,780,287 | 10/1988 | Zeff et al. . |
| 4,793,931 | 12/1988 | Stevens et al. .......................... 210/636 |
| 4,940,808 | 7/1990 | Schulz et al. . |
| 4,941,957 | 7/1990 | Zeff et al. . |
| 5,098,612 | 3/1992 | Rowsell .................................. 252/628 |
| 5,155,531 | 10/1992 | Kurotori et al. . |
| 5,430,228 | 7/1995 | Ciambrone et al. . |
| 5,457,269 | 10/1995 | Schonberg . |
| 5,580,458 | 12/1996 | Yamasaki et al. . |

FOREIGN PATENT DOCUMENTS 261687  3/1988  European Pat. Off. ......... A62D 3/00

OTHER PUBLICATIONS

Freshour et al.; Two–Phase Ozonation of Hazardous Organics in Single and Multicomponent Systems; Wat. Res.; vol. 30; No. 9; 1996; 1949–58.

Bhattacharyya et al.; Destruction and Dechlorination of Hazardous . . . by Two–Phase Ozonation Reactions; Fifth World Congress on Chemical Engineering; Jul. 1996.

Guha et al.; Multiphase Ozonolysis of Organics in Wastewater by a Novel Membrane Reactor; Environmental and Energy Engineering; vol. 41; No. 8; Aug. 1995; 1998–2012.

Bhattacharyya et al.; Two–Phase Ozonation of Chlorinated Organics; Journal of Hazardous Materials; vol. 41; 1995; 73–93.

Poddar et al.; Removal of VOCs from Air by Membrane–Based Absorption and Stripping; Journal of Membrane Science; vol. 120; 1996; 231–237.

*Primary Examiner*—Gary P. Straub
*Assistant Examiner*—Eileen E. Nave
*Attorney, Agent, or Firm*—King and Schickli

[57] ABSTRACT

The present invention relates to a method of destroying hazardous vapor phase or aqueous phase organic compound(s) by providing a polymeric siloxane based solvent in a vessel and adding the hazardous organic compound(s) and ozone to the solvent. The solvent may also comprise a mixture of polymeric siloxane based solvent and fluorinated hydrocarbon solvent.

6 Claims, 3 Drawing Sheets

METHOD OF DESTROYING HAZARDOUS ORGANIC COMPOUNDS

This invention was made with U.S. Government support under cooperative agreement number CR 819673-01-1 awarded by the U.S. Environmental Protection Agency and, accordingly, the United States of America may have rights to this invention under the above grant.

TECHNICAL FIELD

The present invention relates generally to a method of degrading, decomposing or destroying hazardous aqueous and vapor phase organic compounds utilizing ozone.

BACKGROUND OF THE INVENTION

Ozone is an allotropic form of the element oxygen that functions as a powerful oxidant, bleach and water purifier. Upon contact with water ozone decomposes rapidly to produce free radicals that may be effectively utilized to treat industrial waste. In fact, in the presence of water, ozone acts more rapidly than hydrogen peroxide, chlorine and sulfur dioxide. Bacterial and viral disinfection utilizing ozone is up to 5000 times more rapid than comparable treatments utilizing chlorine.

Despite its effectiveness the efficiency of ozone in treating hazardous aqueous and vapor phase organic compounds in water is extremely low for a number of reasons. These include relatively low ozone solubility in water, rapid ozone decomposition, high gas/liquid mass transfer resistance and non-selective oxidation. Further, ozone gas transfer promotes the loss of volatile organics. Additionally, for vapor phase organic compound destruction from air or gas streams, conventional aqueous phase ozonation is often not possible because of low solubility of those organics in water.

Recognizing these shortcomings, other ozonation methods have been proposed as set forth in, for example, U.S. Pat. Nos. 4,793,931 to Stevens et al. and 4,940,808 to Schultz et al. In the Stevens et al. patent, the photodegradation of solid or liquid phase waste organics by extraction of the organics in a perfluorinated solvent including a photo-oxidant such as ozone is disclosed. In Schultz et al., a process for ozonation of saturated organic compounds by utilizing an ozone-containing gas in halogenated hydrocarbon coolants such as fluorinated methane or ethane is disclosed.

Other prior art references of interest also relating to ozonation include U.S. Pat. Nos. 5,430,228 to Ciambrone et al.; 5,457,269 to Schonberg and 5,580,458 to Yamasaki et al. While effective for their intended purpose, such approaches may be improved upon to provide more efficient degradation or destruction of the vapor phase organic compounds at lower overall cost.

SUMMARY OF THE INVENTION

Accordingly, it is a primary object of the present invention to provide an improved method of destroying hazardous aqueous and vapor phase organic compounds that is more efficient and cost effective than prior art approaches.

Still another object of the present invention is to provide an improved method of ozonation for the degradation, decomposition and destruction of aqueous and vapor phase organic compounds utilizing an inert, non-toxic, reusable solvent system having high ozone capacity and low vapor pressure for concurrent adsorption and destruction of those compounds.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved method is provided for destroying hazardous vapor phase organic compounds. That method may be broadly described as comprising the steps of providing a polymeric siloxane based solvent in a vessel and adding (a) the hazardous aqueous and/or vapor phase organic compounds to be destroyed and (b) ozone to the polymeric siloxane based solvent.

Preferably, the method also includes the step of providing a fluorinated hydrocarbon solvent in the vessel in mixture with the polymeric siloxane based solvent. Preferably, the polymeric siloxane based solvent is a liquid siloxane based solvent having a —Si—O— backbone substituted with methyl groups and ranges in viscosity from 3–200 centistokes (cst). Such a polymeric siloxane based solvent includes polydimethylsiloxanes of viscosities ranging from 3 to 200 and still more preferably 3 to 100 cst (such as, L-45 commercial solvents) and functionalized polysiloxanes as well as any mixtures thereof. These are commercially available from a number of manufacturers including but not limited to Dow Corning of Michigan and OSI Specialties of West Virginia.

Preferably, the fluorinated hydrocarbon based solvent ranges in molecular weight from between 400–900. Such a fluorinated hydrocarbon based solvent includes, for example, FC40, FC77 (by 3M Company) and perflurodecalins as well as any mixtures thereof. These are also commercially available from a number of manufacturers including but not limited to 3M Company of Minnesota.

In accordance with another important aspect of the present invention rubber, preferably in the form of chipped waste tires, is added to the polymeric siloxane based solvent or the combined solvent system. This rubber functions to adsorb the hazardous volatile liquid vapor and hold it for reaction with the ozone: that is, destruction by reaction with the free radicals generated by decomposition of the ozone in the solvent/combined solvent system.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Figure 1:
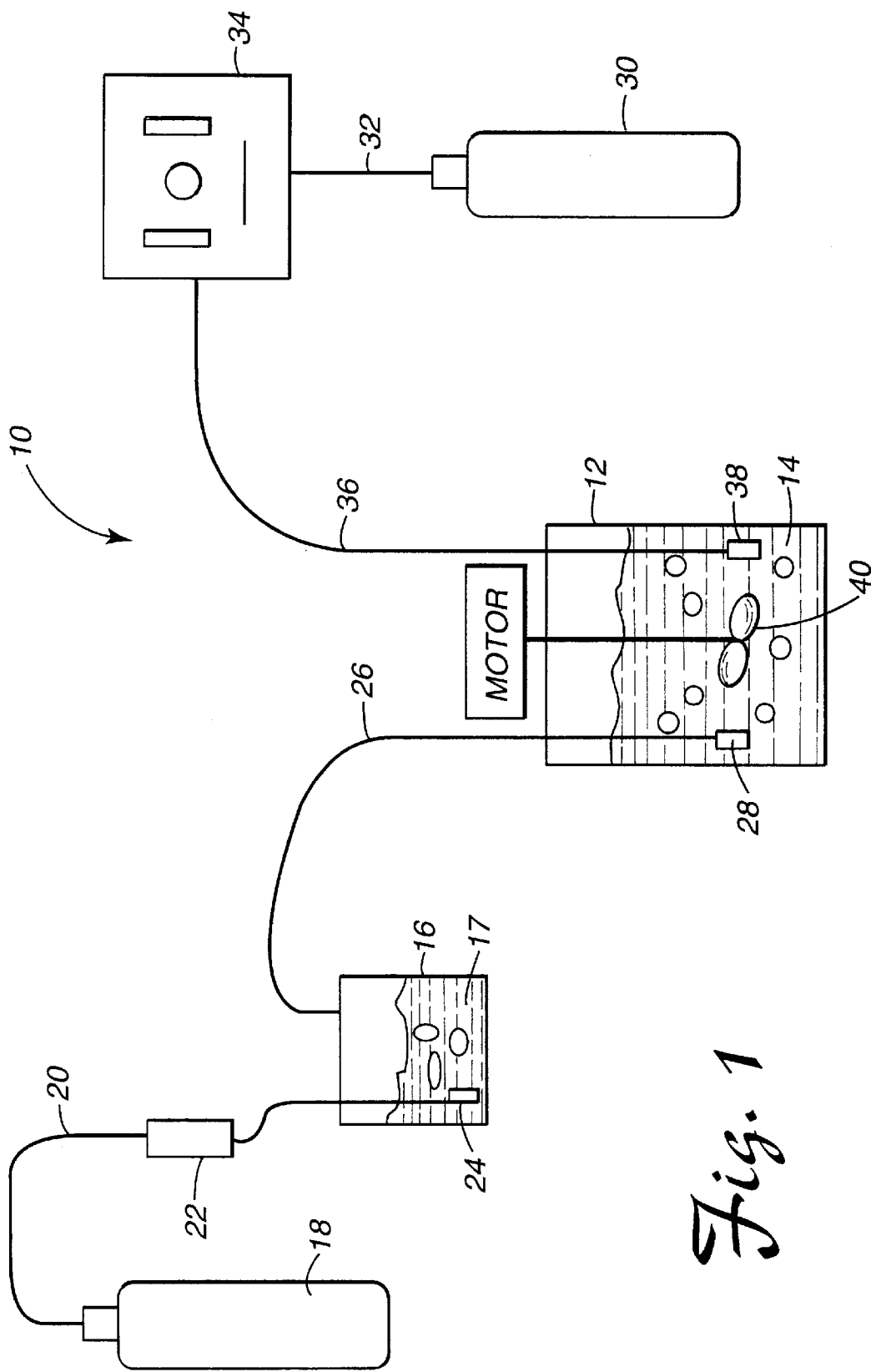
FIG. 1 is a schematic diagram illustrating a testing apparatus that was utilized to perform the method of the present invention for Examples 1 and 2.

Reference will now be made in detail to the present preferred embodiment of the invention, an example of which is illustrated in the accompanying drawing.

DETAILED DESCRIPTION OF THE INVENTION

As indicated above, the present invention relates to a method of degrading, decomposing or destroying hazardous aqueous and/or vapor phase organic compounds in a more effective and efficient manner utilizing ozone. Various aqueous and vapor phase organic compounds may be processed utilizing the present invention. They include but are not limited to substituted and halogenated benzenes and phenols, substituted nitrophenols and amine compounds, halogenated alkenes (unsaturated organics) and mercaptans.

In accordance with the broadest aspects of the present invention, the aqueous and vapor phase organic compounds to be destroyed and ozone are added to/dispersed in a polymeric siloxane based solvent. Advantageously, the solvent provides a relatively high ozone solubility of approximately 5–10 times higher than water. Thus, more ozone is made available for the effective and efficient destruction of the aqueous and/or vapor phase organic compounds. Further, the solvent functions to provide the vapor phase organic compound in optimum droplet sizes (e.g. 10 to 100 $\mu$m) within the solvent so as to provide a liquid/liquid interface that improves upon the ozone treatment efficiency and provides a higher destruction rate of the vapor phase organic compound. Advantageously, the solvent is also stable and effectively inert during the treatment process so that the solvent may be completely recycled. This not only avoids adverse environmental impact, but substantially lowers operating costs.

In accordance with a further aspect of the present invention, the solvent system may include a fluorinated hydrocarbon based solvent in mixture with the polymeric siloxane based solvent. In many applications this combined solvent system increases the destruction efficiency of the ozone while still providing a relatively high ozone solubility and remaining stable and effectively inert during the treatment process. Thus, this alternative solvent system also may be completely recycled, thereby avoiding adverse environmental impact and substantially lowering operating costs.

A wide range of polymeric siloxane based solvents may be utilized in the present method. Examples of such solvents include commercial polydimethylsiloxanes such as, L-45-3, L-45-20, L-45-30, etc. as well as any mixtures thereof. Preferably, those solvents have an —Si—O— backbone substituted with methyl groups and range in viscosity from 3–200 centistokes. Such polymeric siloxane based solvents include substantially any of the polydimethylsiloxane based solvents commercially available in the marketplace.

The fluorinated hydrocarbon based solvents that may be utilized in the combined solvent system of the present method range in molecular weight from between 400–900. Such fluorinated hydrocarbon based solvents include, for example, FC40 and FC77 of 3M Company as well as any mixtures thereof. These are all commercially available and many at reasonable costs.

In accordance with another important aspect of the present invention, rubber is added to the solvent/combined solvent system. Any convenient and economical source of rubber, such as chipped waste tires may be utilized. Preferably, between 1–20 g of rubber is added per liter of solvent/combined solvent system. This rubber adsorbs hazardous vapor phase organic compounds thereby effectively holding those compounds in the solvent/combined solvent system until such time as they react with ozone generated free radicals and are thereby destroyed.

In accordance with the present method, the hazardous aqueous and/or vapor phase organic compounds and ozone are added to/dispersed in a polymeric siloxane based solvent or a combination of a polymeric siloxane based solvent and a fluorinated hydrocarbon based solvent system in accordance with any known approach appropriate for the intended purpose. Operation may be by batch, continuous or plug-flow mode depending upon the best approach for a particular application.

For example, the polymeric siloxane based solvent or the combined polymeric siloxane based solvent and fluorinated hydrocarbon based solvent system may be placed in a reaction vessel. Rubber in one form or another may also be placed in the reaction vessel if desired. Both ozone and the hazardous vapor phase organic compound to be destroyed may then be bubbled directly through the solvent system which may also include an agitator to provide further dispersion. In such an arrangement the ozone output of an ozonator may be introduced by means of a sparger into the solvent system. Simultaneously, the hazardous vapor phase organic compound may be maintained in a separate vessel. Introduction of a gas stream (e.g. nitrogen) into this separate vessel serves to volatilize the vapor phase organic compound which is then delivered by the gas stream through a separate sparger and dispersed into the siloxane based solvent/combined solvent system. There the ozone readily reacts with the hazardous vapor phase organic to complete its decomposition and destruction.

In an alternative approach, the hazardous aqueous and/or vapor phase organic compound may be added directly to the polymeric siloxane based solvent/combined solvent system in either a liquid or gaseous form. Still further, a liquid such as water contaminated with the hazardous vapor phase organic compound may be directly added to the polymeric siloxane based solvent system to allow reaction with the ozone. As stated above any approach may be utilized just so long as the hazardous organic compound to be destroyed and the ozone are simultaneously delivered for reaction in the polymeric siloxane based solvent or the polymeric siloxane based solvent and fluorinated hydrocarbon based solvent system.

Reference will now be made to FIG. 1 schematically showing an apparatus 10 used in demonstrating the efficacy of the method of the present invention for the destruction of hazardous organic compounds in an efficient and effective manner. The apparatus 10 being described was particularly useful for batch testing. As shown in FIG. 1, the apparatus included a vessel 12 for holding a solvent 14. In accordance with the present invention, that solvent 14 was a polymeric siloxane based solvent or a mixture of a polymeric siloxane based solvent and a fluorinated hydrocarbon based solvent which formed a combined solvent system.

The apparatus 10 also included a vessel 16 that held a liquid source of the vapor phase organic compound to be treated and destroyed. Nitrogen gas was delivered and disbursed into the volatile phase organic compound in the vessel 16 from a source 18 by means of the flow line 20, flow meter 22 and sparger 24. The nitrogen gas bubbling through the liquid in the vessel 16 functioned to vaporize the volatile phase organic compound which was then delivered through the flow line 26 and dispersed by the sparger 28 into the solvent 14 in the vessel 12.

Simultaneously, oxygen from an oxygen source 30 was delivered through the flow line 32 to an ozonator 34 where ozone was produced. The ozone so produced was then delivered through the flow line 36 to the sparger 38 which dispersed the ozone in the solvent 14.

During processing the nitrogen flow rate through the flow meter 22 was maintained between substantially 100 and 500 ml/s. The oxygen flow rate from the oxygen source 30 was maintained at substantially 0.2 L/min so that ozone was generated by the ozonator 34 at between substantially 0.004 to 0.008 L/min. This results in substantially 2–4% of the oxygen delivered through the sparger 38 into the solvent 14 being ozone.

Reference will now be made to the following Examples which further illustrate the utility of the present invention.

EXAMPLE 1

Figure 2:
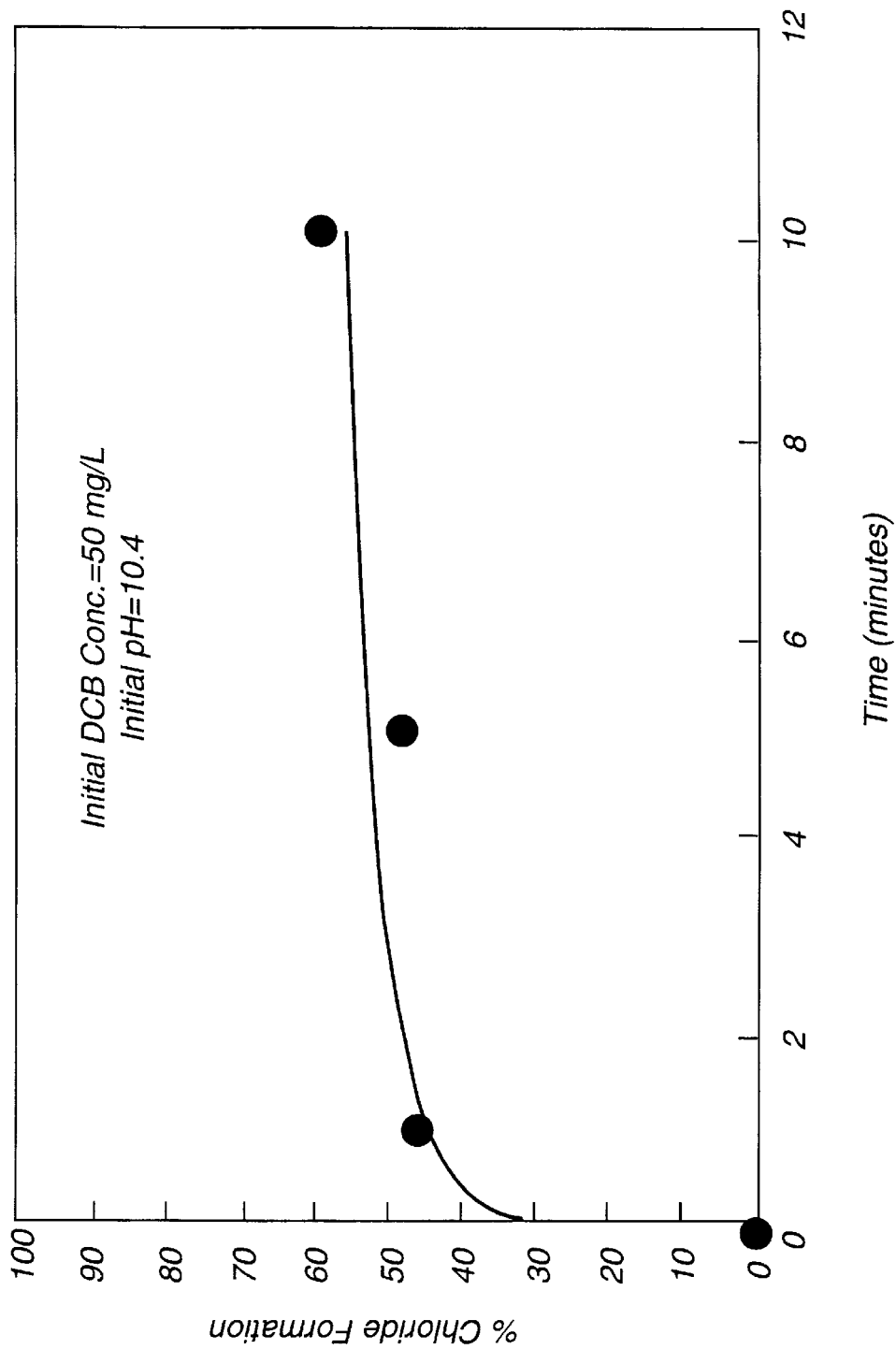
FIG. 2 is a graphical representation illustrating the dechlorination of 1,3-dichlorobenzene in a L-45-20 polydimethylsiloxane/distilled water system.

550 ml of a water and trichloro,ethylene mixture were placed in vessel 12. The trichloroethylene concentration in the mixture was 58 mg/L. 350 ml of polydimethylsiloxane (solvent L-45-20 polydimethylsiloxane as manufactured and sold by Dow Corning) were added to the vessel 12 and mixed by the agitator 40). This experiment was conducted to study the direct destruction of the organic compound from the aqueous phase. Simultaneously, oxygen at a flow rate of 0.2 L/min was delivered to the ozonator which provided 2–4% ozone into the solvent in the vessel 12. It was found that the trichloroethylene concentration was reduced from 58 mg/L to below 1 mg/L within 1 minute (aqueous phase concentration) with substantial dechlorination. The oxidation of 1,3-dichlorobenzene produced free chloride as a final product. It was found that 60% of the maximum chloride formed in 10 minutes (see FIG. 2). The percent of free chloride formation was calculated from the total amount of chloride formed by complete destruction of the organic.

EXAMPLE 2

Figure 3:
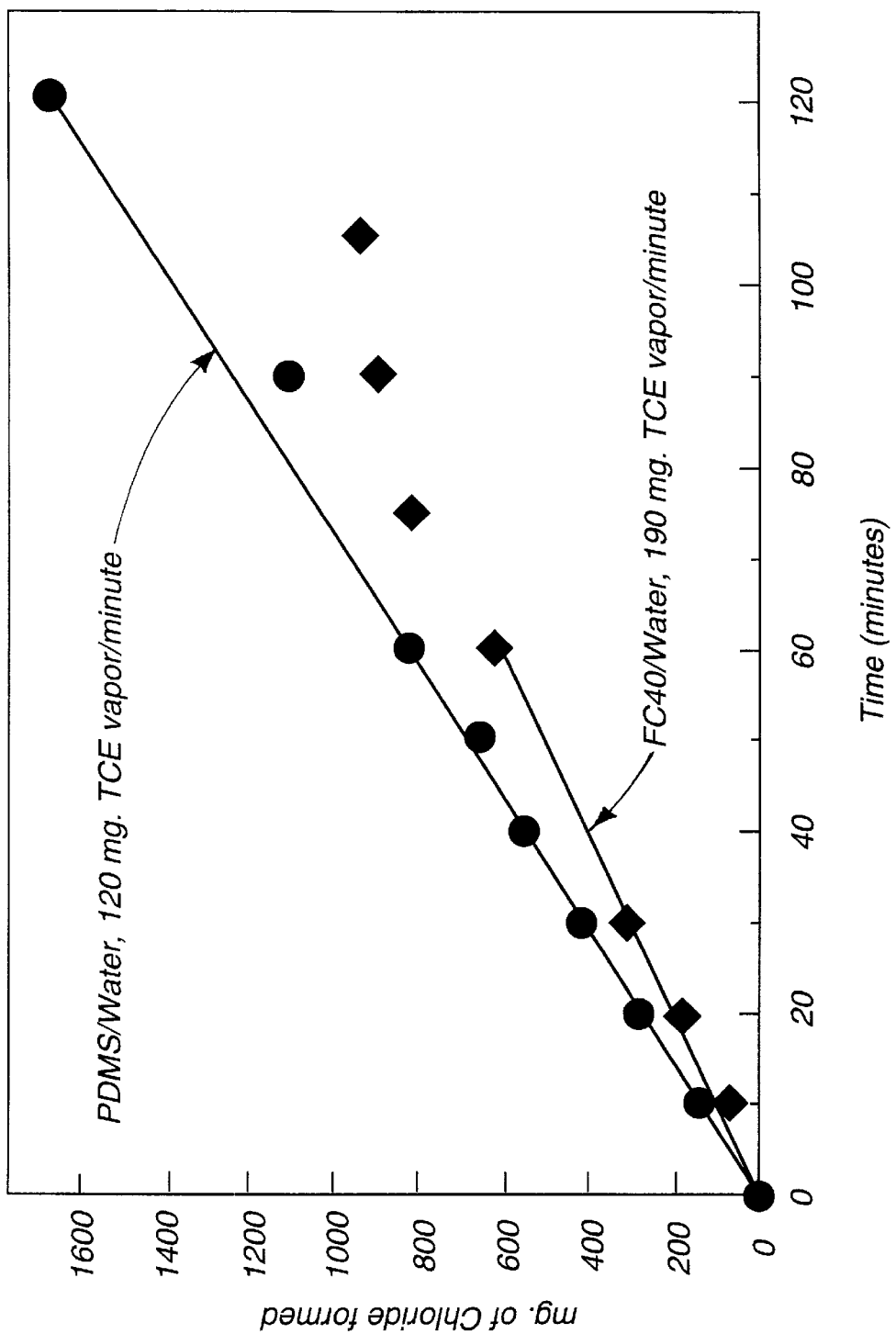
FIG. 3 is a graphical illustration of free chloride formation from the oxidation of trichloroethylene vapor in a multi-phase ozonation system including polydimethylsiloxane, a fluorinated hydrocarbon and water.

This example demonstrates vapor phase organic compound destruction (in contrast to Example 1 which was for aqueous phase destruction) by multi-phase ozonation. Trichloroethylene vapor (generated by bubbling nitrogen at 100 to 500 ml/s through liquid in tank 16). Vessel 12 contained the same amount of solvent plus water as in Example 1. FIG. 3 shows the subsequent free chloride formation from the oxidation of the trichloroethylene utilizing L-45-20 or FC40 solvent system. This graphically demonstrates the ability of a small amount of the solvent system to sorb the organic vapor and provide a media for its rapid destruction.

In summary, numerous benefits result from employing the concepts of the present invention. The present invention utilizes a solvent/combined solvent system providing a high ozone solubility. This high solubility allows the present method to better handle any perturbations and fluctuations in the inlet gas flow delivering volatile liquid phase organic compounds for destruction. This is particularly true since the solvent/combined solvent system also provides a high sorption capacity for the vapor phase organic compound being treated. As a result, ozone is utilized more efficiently compared to prior art aqueous phase ozonation systems. It should also be recognized that the solvent/combined solvent system is stable and recyclable. Accordingly, the overall cost of ozone generation, overall energy consumption and environmental impact are all significantly lowered while a more rapid destruction of organics without the use of any UV light is provided. As an added benefit, the present method may be easily retrofitted in existing waste treatment facilities for treatment of both aqueous and vapor phase organic compounds.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A method of destroying a hazardous organic compound, comprising the step of:

reacting the hazardous organic compound with ozone in a vessel containing a polymeric siloxane based solvent, a fluorinated hydrocarbon solvent and particulate rubber.

2. The method set forth in claim 1, wherein said polymeric siloxane based solvent is a liquid siloxane based solvent having an —Si—O— backbone substituted with methyl groups and ranges in viscosity from 3–200 centistokes.

3. The method set forth in claim 1, wherein said polymeric siloxane based solvent is polydimethylsiloxane.

4. The method set forth in claim 2, wherein said fluorinated hydrocarbon based solvent ranges in molecular weight from between 400–900.

5. The method set forth in claim 1, wherein said fluorinated hydrocarbon based solvent ranges in molecular weight from between 400–900.

6. The method set forth in claim 1, including the step of utilizing chipped tires as a source of said rubber.

* * * * *